Dec. 23, 1947.  W. B. TERRY  2,433,073
VEHICLE WHEEL
Filed Aug. 25, 1945
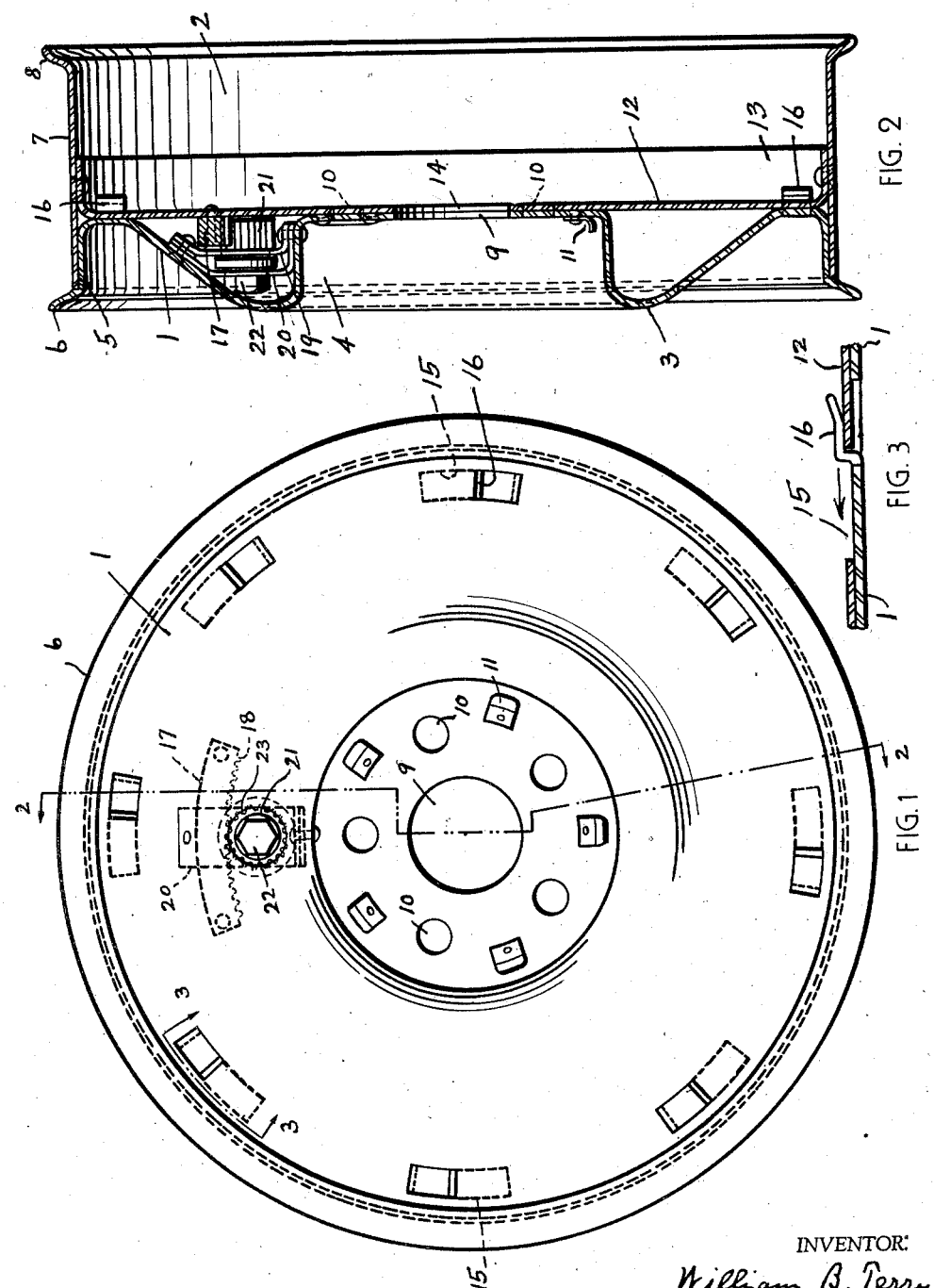
INVENTOR:
William B. Terry
BY E. V. Hardway
attorney.

Patented Dec. 23, 1947

2,433,073

UNITED STATES PATENT OFFICE 2,433,073

VEHICLE WHEEL

William B. Terry, Houston, Tex.

Application August 25, 1945, Serial No. 612,653

2 Claims. (Cl. 301—63)

This invention relates to a vehicle wheel.

An object of the invention is to provide a wheel of the character described designed to receive a pneumatic tire and composed of two parts which may be readily separated when it is desired to mount, or demount, the tire.

It is another object of the invention to provide means for maintaining the two parts of the wheel together which are of such construction that the said parts may be readily separated when the tire is to be mounted on, or demounted from the wheel and then readily re-connected.

With the above and other objects in view the invention has particular relation to certain novel features of construction, arrangement of parts and use, an example of which is given in this specification and illustrated in the accompanying drawings, wherein—

Figure 1 is a side view of the wheel shown demounted from the hub.

Figure 2 is a cross-sectional view taken on the line 2—2 of Figure 1; and

Figure 3 is a fragmentary, sectional view taken on the line 3—3 of Figure 1.

In the drawings the numeral 1 designates the outer section of the wheel as a whole and the numeral 2 designates the inner section.

The outer section 1 of the wheel may be of any selected design. As shown it has the outer convex annular portion 3 surrounding the hub portion and providing the central depression 4 to receive the hub cap. At its margin it is formed with an external countersunk depression forming an annular seat 5 and beyond said seat it terminates in the tire retaining flange 6.

The inner section 2 of the wheel is composed of the annular, tire supporting rim 7, one margin of which fits into the seat 5 and whose other margin is formed into the inside tire retaining flange 8. The tire retaining flanges 6 and 8 preferably diverge outwardly as shown.

The outer section 1 of the wheel has a central opening 9 to receive the hub of the wheel and around said opening 9 it is also provided with the bolt holes 10 to receive the bolts by means of which the wheel is secured to the hub. Said outer section 1 also has the external clips 11 around the central opening 9 to engage with the hub cap and hold it in place.

The inner section 2 also includes an annular platelike diaphragm 12 which fits within, and is secured to, the rim 7. The outer margin of this diaphragm is overturned inwardly forming the annular flange 13 which fits against the inner side of the rim 7 and is suitably secured thereto.

This diaphragm fits closely against the outer section of the wheel, when the parts are assembled and it has a central opening 14 which registers with the opening 9 and it is provided with bolt holes 19 which register with the holes 10 of the section 1 when the two sections of the wheel are assembled together, so as to receive the hub bolts by means of which the wheel is secured to the hub.

The diaphragm 12 has a series of oblong, arcuate slots 15 cut therethrough adjacent its outer margin and the outer section 1 of the wheel has a corresponding number of clamps 16 which are thrown outwardly from the material thereof, as illustrated in Figure 3. These clamps are arranged to correspond to the arrangement of the slots 15 and when the outer and inner sections of the wheel are assembled together the clamps project through the slots and engage and clamp the diaphragm 12, as illustrated in Figure 3, so as to hold the sections together. Of course, when the wheel is installed on the hub the bolts through the bolt holes 10 will permanently hold the said sections together while the wheel is in use.

Fastened to the forward side of the diaphragm 12 there is an arcuate rack member 17 having the inside gear teeth 18.

In front of said rack member and securely fastened to the outer section 1 of the wheel are the spaced inside and outside brackets 19 and 20. In mesh with the gear teeth 18 there is a spur gear wheel 21 which is fixed on the inner end of the stub shaft 22. This shaft is mounted to rotate in suitable bearings in the brackets 19 and 20 and its outer end is formed polygonal to receive a socket wrench which may be inserted through the opening 23 of the outer section 1 of the wheel.

When it may be desired to demount a tire the wheel may be detached from the hub in the usual way and the socket wrench applied to the outer end of the shaft 22 and said shaft and the gear 21 may be rotated to rotate the section 1 in the direction indicated by the arrow in Figure 3 relative to the section 2 so as to disengage the lugs 16 from the diaphragm 12 and permit them to pass through the slots 15 and the sections may then be separated and the tire easily demounted.

When it is desired to mount a tire the sections may be separated as explained and the tire mounted on the rim 7 and the outer section 1 may be then fitted into the tire rim with the lugs 16 opposite the slots 15 so that said lugs will pass through said slots and the wrench may then be applied to the shaft 22 and turned so as to rotate the outer section 1 in a direction the opposite of that indicated by the arrow in Figure 3 and said lugs may thus be forced over the adjacent margins of the diaphragm 12, as shown in Figure 3. To facilitate this operation the free ends of the lugs 16 are outwardly turned, or beveled, away from the diaphragm 12, as also clearly shown in Figure 3. The outer and inner sections of the wheel are thus held together while the wheel is being mounted on, or demounted from, the hub and when mounted on the hub the hub bolts through the openings 10 will secure said sections of the wheel together while the wheel is in use.

The drawings and description are illustrative merely while the broad principle of the invention will be defined by the appended claims.

What I claim is:

1. A wheel comprising, an outer circular section having outer and inner concentric annular faces and being outwardly convex between said faces and said section also having an external countersunk depression at its margin forming an annular seat, said section terminating in an outside tire retaining flange beyond said seat; an inner section composed of an annular tire supporting rim one margin of which fits into said seat and whose other margin is formed into an inside tire retaining flange, an annular plate-like diaphragm which fits within and is secured to said rim and which fits against both of said annular faces; said sections having central, registering hub receiving openings and bolt holes around said openings, one of said sections being provided with an annular series of oblong slots and flexible clamps on the other section arranged to fit through said slots, an arcuate rack member secured to said diaphragm, a spur gear mounted to rotate on the outer section within the convex portion thereof and in mesh with said rack, a shaft having a polygonal head secured to said spur gear said outer section having a wrench receiving opening whereby a wrench may be applied to said head to relatively rotate the sections in one direction to bring said bolt holes into registration and to cause the clamps to engage the slotted section to clamp the sections together or to relatively turn the sections in the other direction to allow the clamps to pass through the slots to permit separation of the sections.

2. A wheel comprising, an outer circular section having outer and inner concentric annular faces and being outwardly convex between said faces and said section also having an external countersunk depression at its margin forming an annular seat, said section terminating in an outside tire retaining flange beyond said seat; an inner section composed of an annular tire supporting rim one margin of which fits into said seat and whose other margin is formed into an inside tire retaining flange, an annular plate-like diaphragm which fits within and is secured to said rim and which fits against both of said annular faces; said sections having central, registering hub receiving openings and bolt holes around said openings, one of said sections being provided with an annular series of oblong slots and flexible clamps on the other section arranged to fit through said slots, an arcuate rack member secured to said diaphragm, a shaft mounted to rotate on the outer section within the convex portion thereof, and having a polygonal head, a spur gear secured to the shaft and in mesh with said rack member, said outer section having a wrench receiving opening whereby a wrench may be applied to said head to rotate the gear to relatively rotate the sections in one direction to cause the clamps to engage the slotted section to clamp the sections together or to relatively turn the sections in the other direction to allow the clamps to pass through the slots to permit separation of the sections.

WILLIAM B. TERRY.

REFERENCES CITED

The following references are of record in the file of this patent:

UNITED STATES PATENTS

| Number | Name | Date |
|---|---|---|
| 1,888,637 | Ferguson | June 27, 1916 |
| 1,414,594 | Snow | May 2, 1922 |
| 1,579,044 | Westley | Mar. 30, 1926 |
| 2,192,064 | Pettinati | Feb. 27, 1940 |
| 2,219,156 | Yankee | Oct. 22, 1940 |
| 2,308,959 | Brink | Jan. 19, 1943 |
| 1,406,920 | Balenbaugh | Feb. 14, 1922 |
| 2,246,710 | Babin | June 24, 1941 |